US012259793B2

(12) United States Patent
Von Hein et al.

(10) Patent No.: US 12,259,793 B2
(45) Date of Patent: Mar. 25, 2025

(54) ALLOCATING SYSTEM RDP METADATA SPACE WITH IO PERFORMANCE PRIORITY

(71) Applicant: Dell Products L.P., Hopkinton, MA (US)

(72) Inventors: Nicholas Von Hein, Riverside, RI (US); Michael Ferrari, Douglas, MA (US); Kevin Tobin, Hopedale, MA (US); Gu Huang, Chelmsford, MA (US); Akshay Srivastava, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 142 days.

(21) Appl. No.: 18/191,945

(22) Filed: Mar. 29, 2023

(65) Prior Publication Data

US 2024/0330116 A1    Oct. 3, 2024

(51) Int. Cl.
*G06F 11/14* (2006.01)
*G06F 9/50* (2006.01)

(52) U.S. Cl.
CPC ........ *G06F 11/1456* (2013.01); *G06F 9/5033* (2013.01); *G06F 11/1451* (2013.01)

(58) Field of Classification Search
CPC . G06F 11/1456; G06F 9/5033; G06F 11/1451
See application file for complete search history.

(56) References Cited

U.S. PATENT DOCUMENTS 11,449,237 B2 *  9/2022  Ferrari .................. G06F 3/0617
12,019,581 B2 *  6/2024  Kim ...................... G06F 15/167
2003/0195886 A1 * 10/2003  Vishlitzky ............. G06F 3/0614
2008/0148002 A1 *  6/2008  Fleming ................ G06F 12/023
                                                              711/170
2017/0052717 A1 *  2/2017  Rawat .................. G06F 16/2246

FOREIGN PATENT DOCUMENTS

CN          116775518 A   *  9/2023     ......... G06F 12/0875

OTHER PUBLICATIONS

Wikipedia: The Free Encyclopedia (Multi-core Processor) (Year: 2023).*
English translation of CN-116775518-A (translation provided by PE2E search) (Year: 2023).*

* cited by examiner

*Primary Examiner* — Matthew M Kim
*Assistant Examiner* — Kayo Lisa Rusin
(74) *Attorney, Agent, or Firm* — Anderson Gorecki LLP

(57) ABSTRACT

Memory management processes allocate and recycle pages of replication data pointer (RDP) metadata space in shared memory. When the RDP page currently allocated to an IO thread becomes full, that RDP page is released, and a new RDP page is allocated to the IO thread. The released page eventually becomes fragmented and is added to a list of RDP pages that are ranked based on partial fullness. An IO thread that needs a new RDP page is allocated a mostly empty RDP page from the ranked list, if such a page is available. Otherwise, a new completely empty RDP page is allocated to the IO thread. Use of the ranked lists reduces latency associated with allocation of new RDP pages. Contention between IO threads for RDP metadata space is reduced because each IO thread has exclusive rights to the free RDP metadata space in its currently allocated page.

20 Claims, 5 Drawing Sheets

ALLOCATING SYSTEM RDP METADATA SPACE WITH IO PERFORMANCE PRIORITY

TECHNICAL FIELD

The subject matter of this disclosure is related to data storage systems.

BACKGROUND

Organizational data storage systems use snapshots to help avoid data loss and recover from data corruption. Snapshots (snaps) are incremental versions of storage object data that contain only changes made to the storage object since creation of the most recent snapshot of the storage object. A time-series of snapshots can be used to recover the storage object as it existed at a prior point in time. A common technique for generating a snapshot is to accumulate data changes over a snap time interval and then write the accumulated changes to a target snap volume. Snap volumes are mountable, which is useful, but the metadata resources required to create and maintain snap volumes can present a significant burden under circumstances in which a data storage system is configured to create snapshots frequently and there are many snapped storage objects. Targetless snapshots require fewer resources to generate and maintain than targeted snaps. A targetless snapshot is built as changes are made to a storage object by creating replication data pointers (RDPs) that reference the original data that has been changed on the storage object since the most recent targetless snap was completed. However, the frequent need for allocation of memory space for RDPs can create contention between consumers of the memory space.

SUMMARY

An apparatus in accordance with some implementations comprises: a plurality of non-volatile drives; at least one compute node comprising shared memory and at least one multi-core processor with a plurality of cores that have access to the shared memory; a plurality of input-output (IO) threads, each IO thread being uniquely associated with one of the cores; and at least one producer thread configured to allocate replication data pointer (RDP) pages to the IO threads, each IO thread being allocated no more than one RDP page at a time, each RDP page configured to accommodate a plurality of RDP nodes containing metadata associated with a targetless snapshot of a storage object.

A method in accordance with some implementations comprises: in a storage system comprising at least one compute node with shared memory and at least one multi-core processor with a plurality of cores that have access to the shared memory: uniquely associated one of a plurality of input-output (IO) threads with one of the cores; and allocating replication data pointer (RDP) pages to the IO threads, each IO thread being allocated no more than one RDP page at a time, each RDP page configured to accommodate a plurality of RDP nodes containing metadata associated with a targetless snapshot of a storage object.

In accordance with some implementations, a non-transitory computer-readable storage medium stores instructions that when executed by a computer cause the computer to perform a method comprising: in a storage system comprising at least one compute node with shared memory and at least one multi-core processor with a plurality of cores that have access to the shared memory: uniquely associated one of a plurality of input-output (IO) threads with one of the cores; and allocating replication data pointer (RDP) pages to the IO threads, each IO thread being allocated no more than one RDP page at a time, each RDP page configured to accommodate a plurality of RDP nodes containing metadata associated with a targetless snapshot of a storage object All examples, aspects and features mentioned in this document can be combined in any technically possible way. Other aspects, features, and implementations will be apparent in view of the detailed description and figures.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g., and without limitation, abstractions of tangible features. The term "physical" is used to refer to tangible features that possibly include, but are not limited to, electronic hardware. For example, multiple virtual computers could operate simultaneously on one physical computer.

Some aspects, features, and implementations described herein may include machines such as computers, electronic components, optical components, and processes such as computer-implemented procedures and steps. It will be apparent to those of ordinary skill in the art that the computer-implemented procedures and process steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
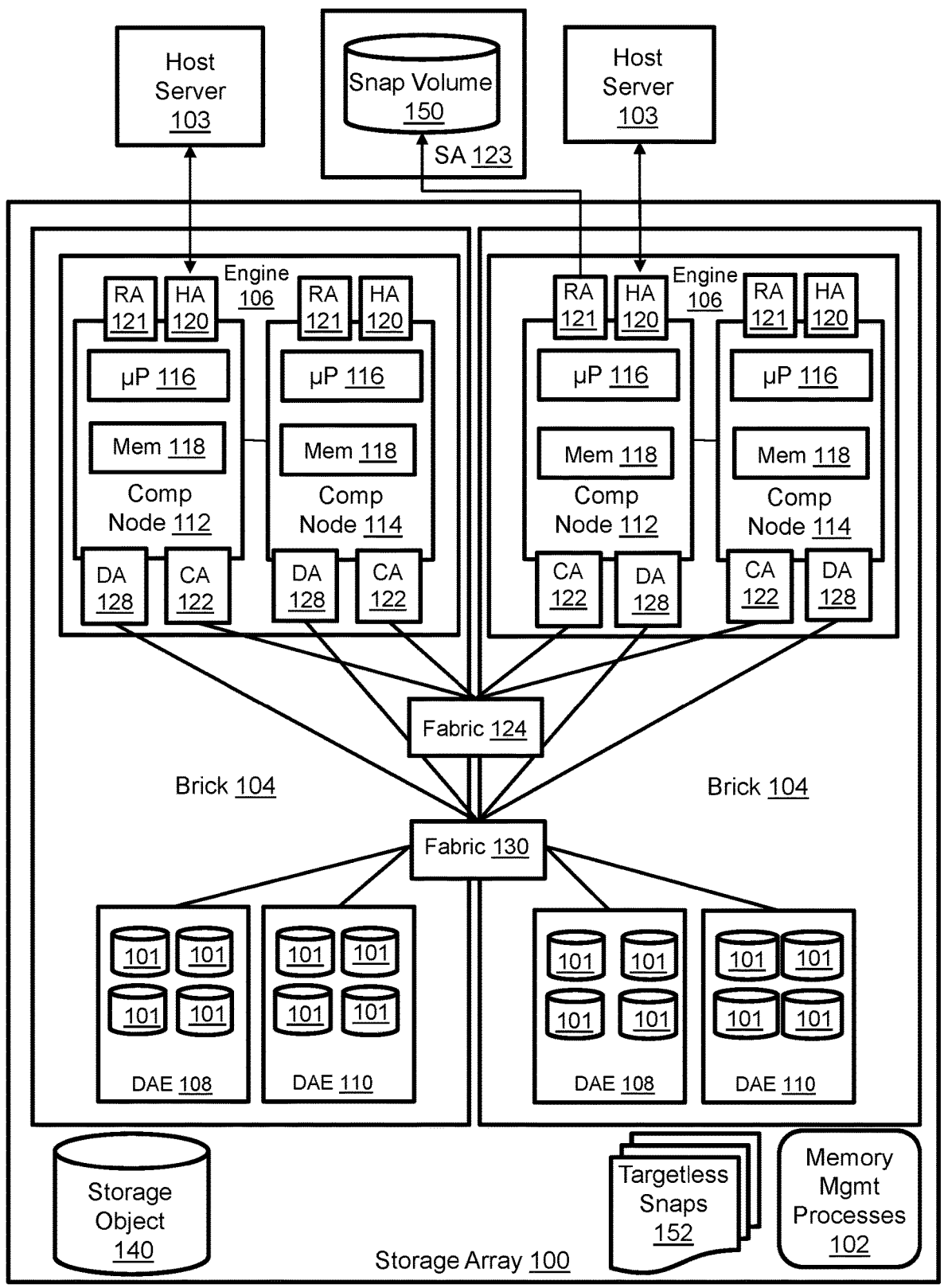
FIG. 1 illustrates a storage array with memory management processes that allocate and recycle pages of RDP metadata space from shared memory.

FIG. 1 illustrates a storage array 100 with memory management processes 102 that allocate and recycle pages of RDP metadata space in shared memory. As will be explained in greater detail below, each processor core runs a single IO thread that has exclusive access to the free RDP node space in a RDP page that is allocated to that IO thread. When the RDP page currently allocated to the IO thread becomes full, that RDP page is released, and a new RDP page is allocated to the IO thread. The released page eventually becomes fragmented and is added to a list of RDP pages that are ranked based on partial fullness. As targetless snapshots are deleted from the storage system, RDP metadata associated with those deleted snapshots are discarded. Consequently, the RDP pages that contained the RDP metadata become less full. An IO thread that needs a new page is allocated a mostly empty page from the ranked list, if such a page is available. Otherwise, a new completely empty page is allocated to the IO thread. Use of the ranked lists reduces latency associated with allocation of new RDP pages. Contention between IO threads for RDP metadata space is reduced because each IO thread has exclusive rights to the free RDP metadata space in its currently allocated page.

The storage array 100 is depicted in a simplified data center environment that includes two host servers 103 that run instances of host applications. Examples of host applications may include organizational software for email, accounting, inventory control, e-business, and a variety of other functions. The host servers 103 include volatile memory, non-volatile storage, and one or more tangible processors. The storage array 100 includes one or more bricks 104. Each brick includes an engine 106 and one or more drive array enclosures (DAEs) 108, 110. Each DAE includes managed drives 101 that are non-volatile storage media such as, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. Each engine 106 includes a pair of interconnected compute nodes 112, 114 that are arranged in a failover relationship and may be referred to as "storage directors." Although it is known in the art to refer to the compute nodes of a storage area network as "hosts," that naming convention is avoided in this disclosure to help distinguish the network server hosts 103 from the compute nodes 112, 114. Nevertheless, the host applications could run on the compute nodes, e.g., on virtual machines or in containers. Each compute node includes resources such as multi-core processors 116 and local memory 118, e.g., on the same printed circuit board as the processors. The processors may include central processing units (CPUs), graphics processing units (GPUs), or both in one or more sockets. The local memory 118 may include volatile media such as dynamic random-access memory (DRAM), non-volatile memory (NVM) such as storage class memory (SCM), or both. Each compute node allocates a portion of its local memory 118 to a logical shared memory that can be accessed by all compute nodes of the storage array using direct memory access (DMA) techniques. Each compute node includes one or more host adapters (HAs) 120 for communicating with the hosts 103. Each host adapter has resources for servicing input-output commands (IOs) from the hosts. The host adapter resources may include processors, volatile memory, and ports via which the hosts may access the storage array. Each compute node also includes a remote adapter (RA) 121 for communicating with other storage systems such as storage array 123. Each compute node also includes one or more drive adapters (DAs) 128 for communicating with the managed drives 101 in the DAEs 108, 110. Each drive adapter has processors, volatile memory, and ports via which the compute node may access the DAEs for servicing IOs. Each compute node may also include one or more channel adapters (CAs) 122 for communicating with other compute nodes via an interconnecting fabric 124. The paired compute nodes 112, 114 of each engine 106 provide failover protection and may be directly interconnected by point-to-point communication links. An interconnecting fabric 130 enables implementation of an N-way active-active backend. A backend connection group includes all drive adapters that can access the same drive or drives. In some implementations every drive adapter 128 in the storage array can reach every DAE via the fabric 130. Further, in some implementations every drive adapter in the storage array can access every managed drive 101 in the storage array.

Host application data is maintained on the managed drives 101. The managed drives 101 are not discoverable by the host servers 103 but the storage array 100 creates storage objects such as storage object 140 that can be discovered and accessed by the hosts. A storage object is a logical storage resource that may be referred to as a device, volume, or LUN, where "LUN" refers to the logical unit number used to identify storage objects in accordance with the small computer system interface (SCSI) protocol. From the perspective of the hosts 103, storage object 140 is a single drive having a set of contiguous fixed-size logical block addresses (LBAs) on which data used by the instances of the host application resides. However, the host application data is physically stored at non-contiguous addresses on various managed drives 101. Metadata that maps between the LBAs of the storage object and the address space of the managed drives is maintained by the compute nodes in the shared memory. The host servers send IO commands to access LBAs of the storage object and the compute nodes use the metadata to process the IO commands as will be described in greater detail below. Although only one storage object is illustrated, the storage array may contemporaneously maintain many storage objects, including one or more for each host application. Targeted snapshots of storage object 140 may be written to snap volumes such as snap volume 150, which may be local or remote, e.g., on storage array 123. Targetless snapshots 152 are local to the storage array 100.

Figure 2:
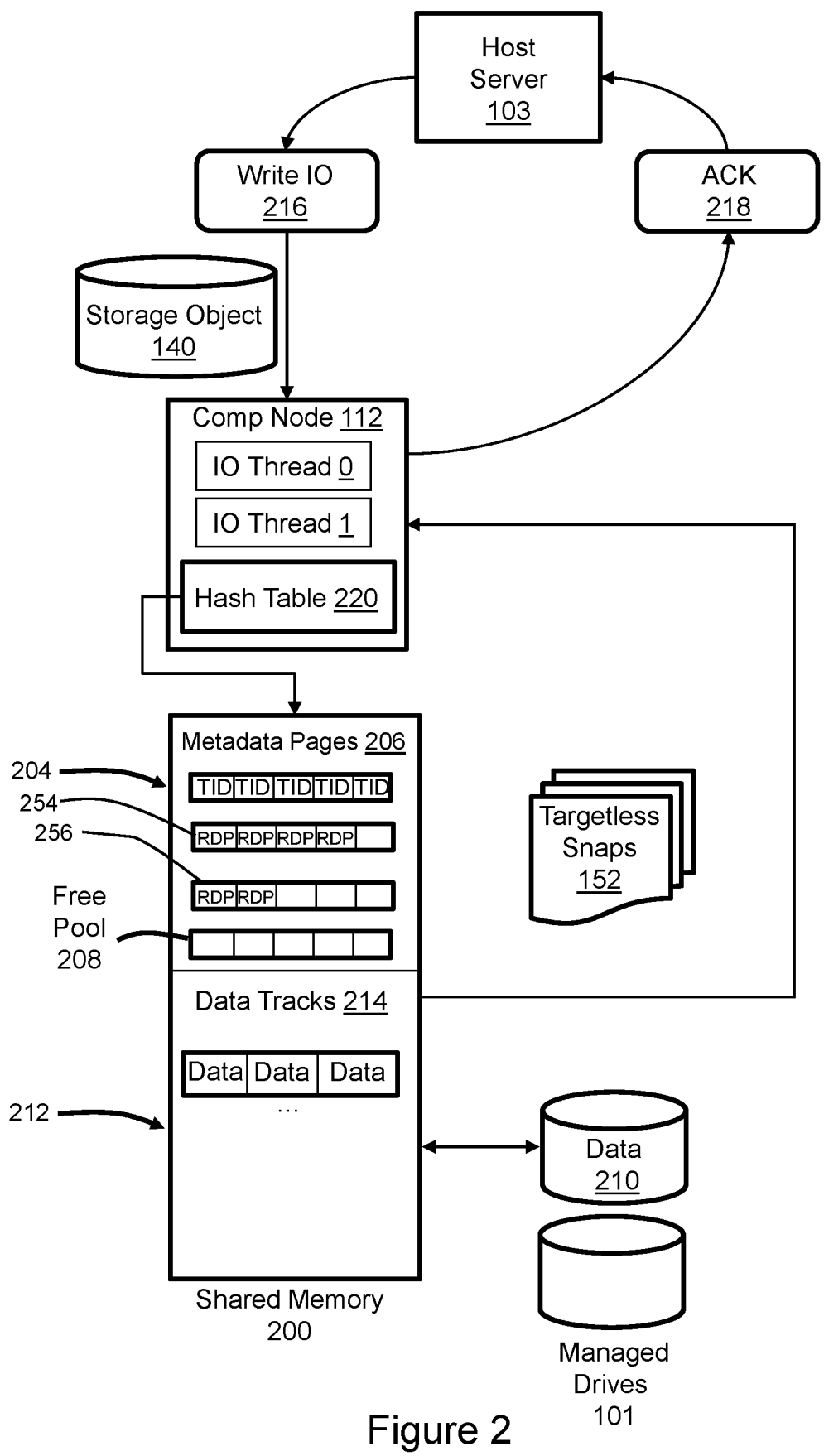
FIG. 2 illustrates processing of a write IO to a storage object that is protected by targetless snaps.

Referring to FIG. 2, the metadata associated with storage object 140 and the targetless snapshots 152 of that storage object is maintained in shared memory 200. The shared memory 200 can be accessed by all compute nodes of the storage array, but affinity techniques may be implemented to bias use of local portions of shared memory in favor of processor cores that are on the same printed circuit board as those local portions of shared memory. A first portion 204 of the shared memory 200 is reserved for holding metadata pages 206. The metadata pages are used to store track identification tables (TIDs) and RDPs. TIDs indicate, among other things, where tracks of host application data corresponding to storage object LBAs are located in the shared memory 200 and managed drives 101. A track is a fixed-size allocation unit of storage capacity that is used by the storage array for processing IO commands and other functions. Typically, a track is larger than the fixed-size blocks used in communications between the storage array and the hosts. RDPs associate host application data in shared memory and the managed drives with targetless snapshots 152. A free pool 208 of empty address space that does not contain RDPs or TIDs is maintained by recycling threads. A second portion 212 of the shared memory 200 is reserved for temporarily holding selected data tracks 214. For example, tracks of data that are required to process IOs are copied into the second portion of the shared memory and tracks of data that are no longer required are destaged from the shared memory to the managed drives or, alternatively, flushed from the shared memory if the track data in the shared memory is redundant with the corresponding track data on the managed drives.

Responsibility for servicing a write IO command 216 sent by a host server 103 to write data to blocks of storage object 140 is assigned to an IO thread (e.g., IO thread 0) running on that compute node, where each IO thread is uniquely associated with a single core and each core runs only one IO thread. The IO thread uses a hash table 220 to obtain metadata page numbers associated with the LBAs being written. Specifically, information such as the device number, cylinder number, head, and size specified in the IO command may be inputted to the hash table. The metadata page numbers resulting from the lookup are used to find corresponding TIDs in the first portion 204 of the shared memory 200. The TIDs are used to find the corresponding tracks of data in the second portion 212 of the shared memory or on the managed drives 101. In order to update the targetless snapshot currently under construction, the IO thread 0 obtains free RDP node space from its allocated RDP page 254 and creates RDP nodes with pointers to the original data that is being changed by the write IO. There is no contention for that free RDP node space because the free node space in page 254 is exclusively allocated to IO thread 0. Similarly, the free node space in page 256 is exclusively allocated to IO thread 1. The changed data being written is copied into the data tracks 214 of the shared memory and the corresponding TIDs are updated to associate the LBAs of storage object 140 with the location of the changed data. An ACK 218 is sent to the host server 103 to indicate that the write IO 216 has been processed. The updated data tracks are subsequently destaged to the managed drives 101 in the background. The original data remains on the managed drives and is pointed-to by the RDPs associated with the targetless snapshot.

Figure 3:
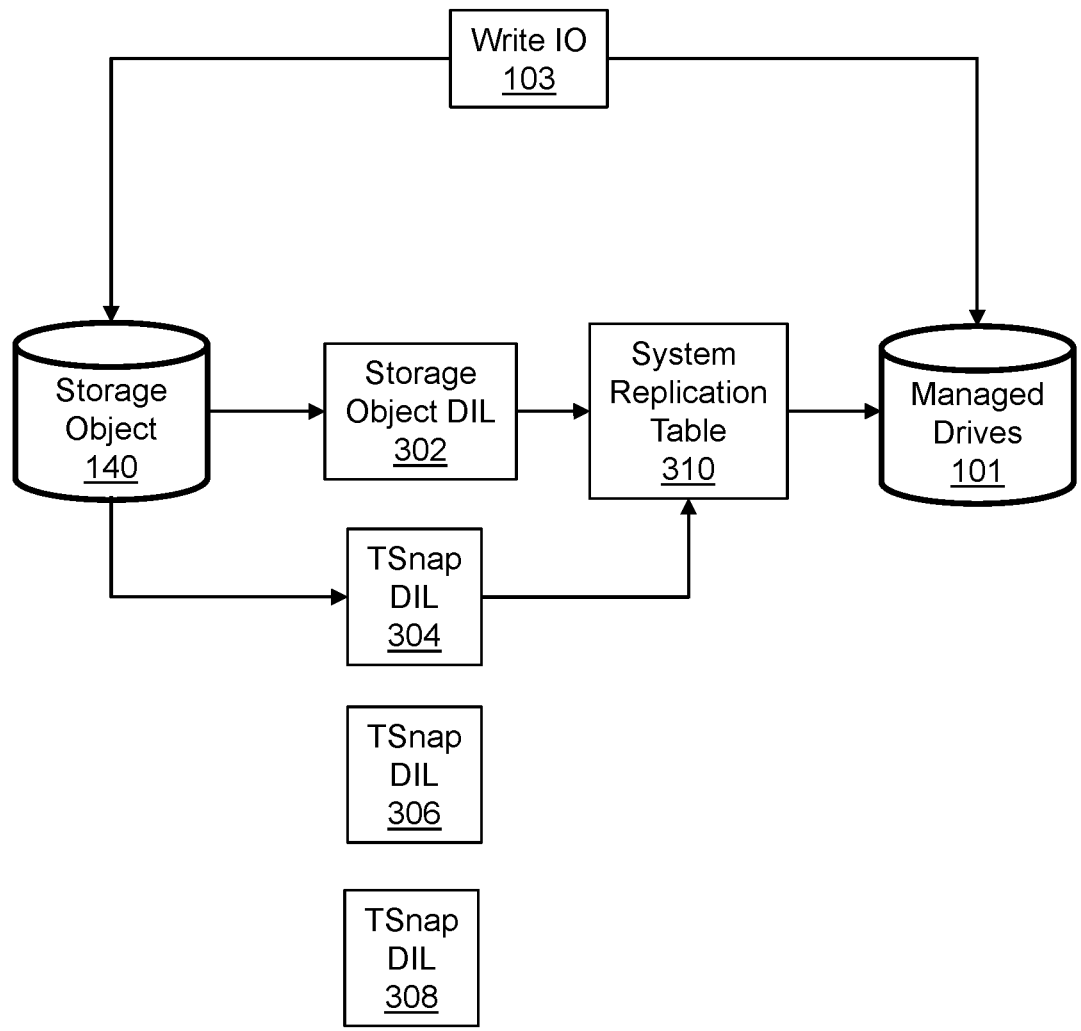
FIG. 3 illustrates RDP tables.

FIG. 3 illustrates RDP tables. Write IO 103 is logically directed to storage object 140 and physically directed to managed drives 101. RDP tables associate LBAs of storage object 140 and targetless snapshots thereof with addresses of tracks on the managed drives 101. At least one direct index lookup (DIL) table is associated with each represented storage object. In the illustrated example, a current DIL table 302 represents the current state of storage object 140 and targetless snapshot DIL tables 304, 306, 308 represent a time-series of targetless snapshots of storage object 140. The targetless snapshot associated with DIL table 304 is under construction in the current snap interval, whereas the targetless snapshots associated with DIL tables 306, 308 have been completed. Each DIL table includes separate entries for same-sized address range portions of the represented storage object, e.g., tracks or LBAs. Each utilized DIL table entry includes a source volume identifier that identifies storage object 140 as the source volume, and the reference number of the described track. Each DIL table is organized into zones of same-sized groups of entries. The zones may be sequentially numbered and be associated with groups of sequentially numbered tracks of the source volume. A system replication table (SRT) 310 has entries that map back-end track allocations for the storage object 140 on the managed drives 101. Each utilized DIL table entry maps a source volume track to an entry in the SRT, and thus to a backend track on the managed drives. The storage array may simultaneously maintain many DIL tables and SRTs. Collectively, the DIL tables and SRTs are referred to as RDP tables and the entries therein are stored in RDP nodes in RDP pages.

Figure 4:
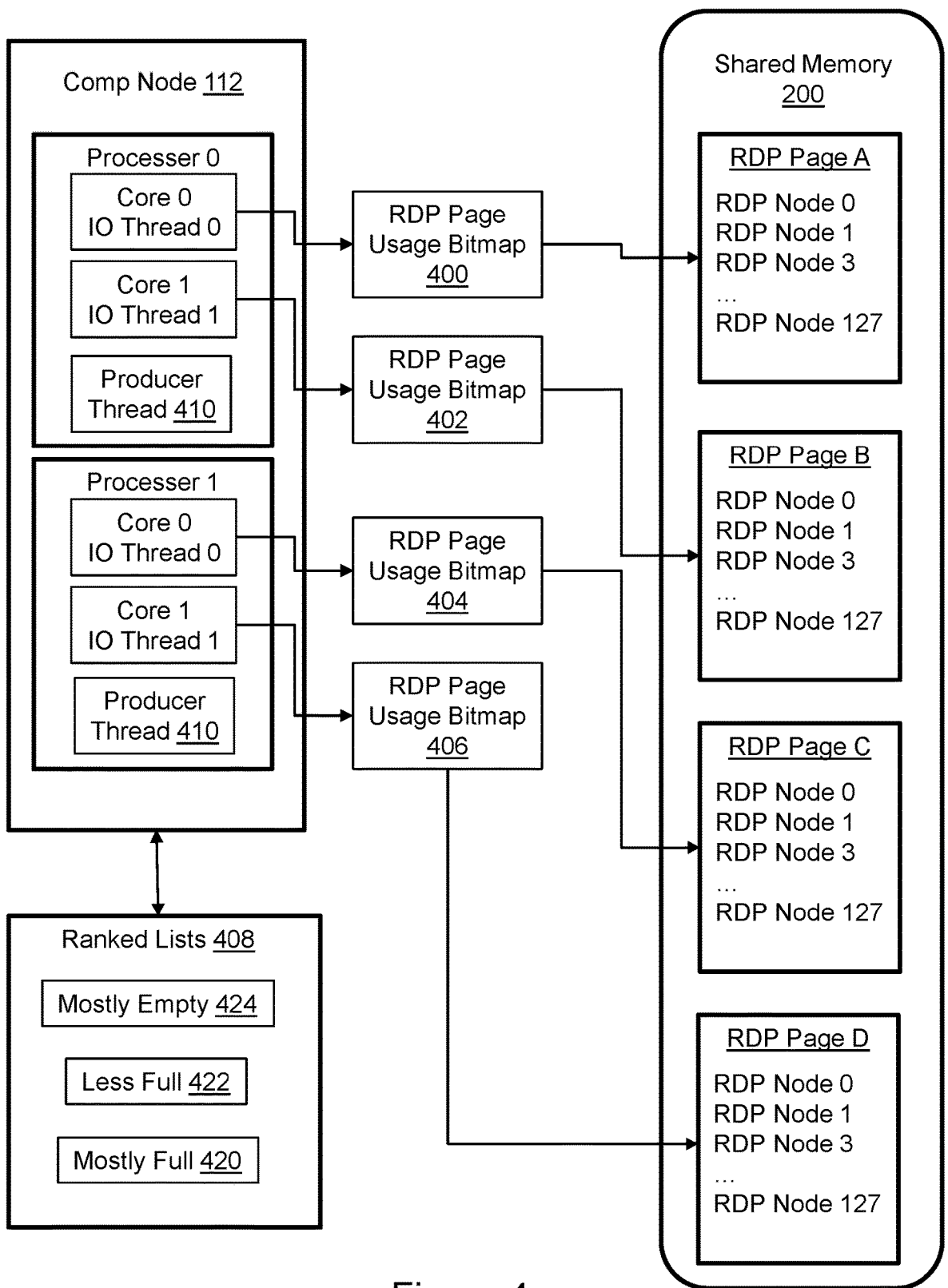
FIG. 4 illustrates RDP page usage bitmaps and ranked lists of unallocated RDP pages.

FIG. 4 illustrates RDP page usage bitmaps and ranked lists of unallocated RDP pages. Simplified compute node 112 includes two processors 0, 1 that each include two cores 0, 1 on which corresponding IO threads 0, 1 run. A separate RDP page usage bitmap is associated with each IO thread/core pair and the RDP page currently allocated to that IO thread/core pair. In the illustrated example, RDP page usage bitmap 400 represents RDP page A that is currently allocated to IO thread 0 of processor 0, RDP page usage bitmap 402 represents RDP page B that is currently allocated to IO thread 1 of processor 0, RDP page usage bitmap 404 represents RDP page C that is currently allocated to IO thread 0 of processor 1, and RDP page usage bitmap 406 represents RDP page D that is currently allocated to IO thread 1 of processor 1. Each RDP page includes sufficient space for 128 RDP nodes. The RDP page usage bitmaps indicate which RDP node locations in the corresponding RDP pages contain populated RDP nodes and which locations are free. Thus, an IO thread is able to quickly locate free RDP node space when needed to process an IO. Moreover, the fullness of the currently allocated RDP page can be easily calculated.

Each IO thread is allocated only one RDP page at any given time. When the currently allocated RDP page is filled (all RDP nodes are populated), the IO thread releases that full RDP page and obtains a new non-full RDP page. Released full RDP pages are added to ranked lists 408 of unallocated RDP pages as the RDP pages become fragmented. When snapshots are removed from the storage system, the RDP nodes related to those snapshots become unnecessary so producer threads 410 remove those RDP nodes from the RDP pages. Removing an RDP node from an RDP page changes the utilization of the RDP page by increasing the amount of free RDP node space. The producer threads update the rankings of RDP pages based on percent usage or percent free space (hereafter collectively percent usage). Whenever an RDP node can be removed from an RDP page, the producer thread calculates the updated percent usage of the RDP page and promotes the RDP page into a different ranked list if appropriate. Removal of a first RDP node from a full RDP page causes the RDP page to be added to a mostly full list 420 of RDP pages, e.g., RDP pages that are less than 10% free. Eventually, the RDP page is moved to less full lists 422 characterized by greater percent free, e.g., 11-20% free and then 21-30% free, and so forth. A mostly free RDP page list 424 contains the RDP pages with the greatest percentages of free space. The percent free range that characterizes the mostly free list is an implementation choice.

When an IO thread needs a new RDP page, the producer thread 410 allocates the new RDP page from the mostly empty list 424, if possible. Because the ranked lists are organized by how much space they have free, a mostly free page can be efficiently allocated to the IO thread consumer, thereby minimizing the amount of write IOs subjected to latency associated with obtaining a new RDP page. If the mostly empty list 424 does not contain any RDP pages, then the producer thread allocates an empty RDP page from the end of the reserved allocation in shared memory. In this way, producer threads can use non-performance path processing to efficiently track fragmentation and assign RDP pages from the mostly free lists to consumer IO threads such that the fragmented metadata space is reused efficiently.

Figure 5:
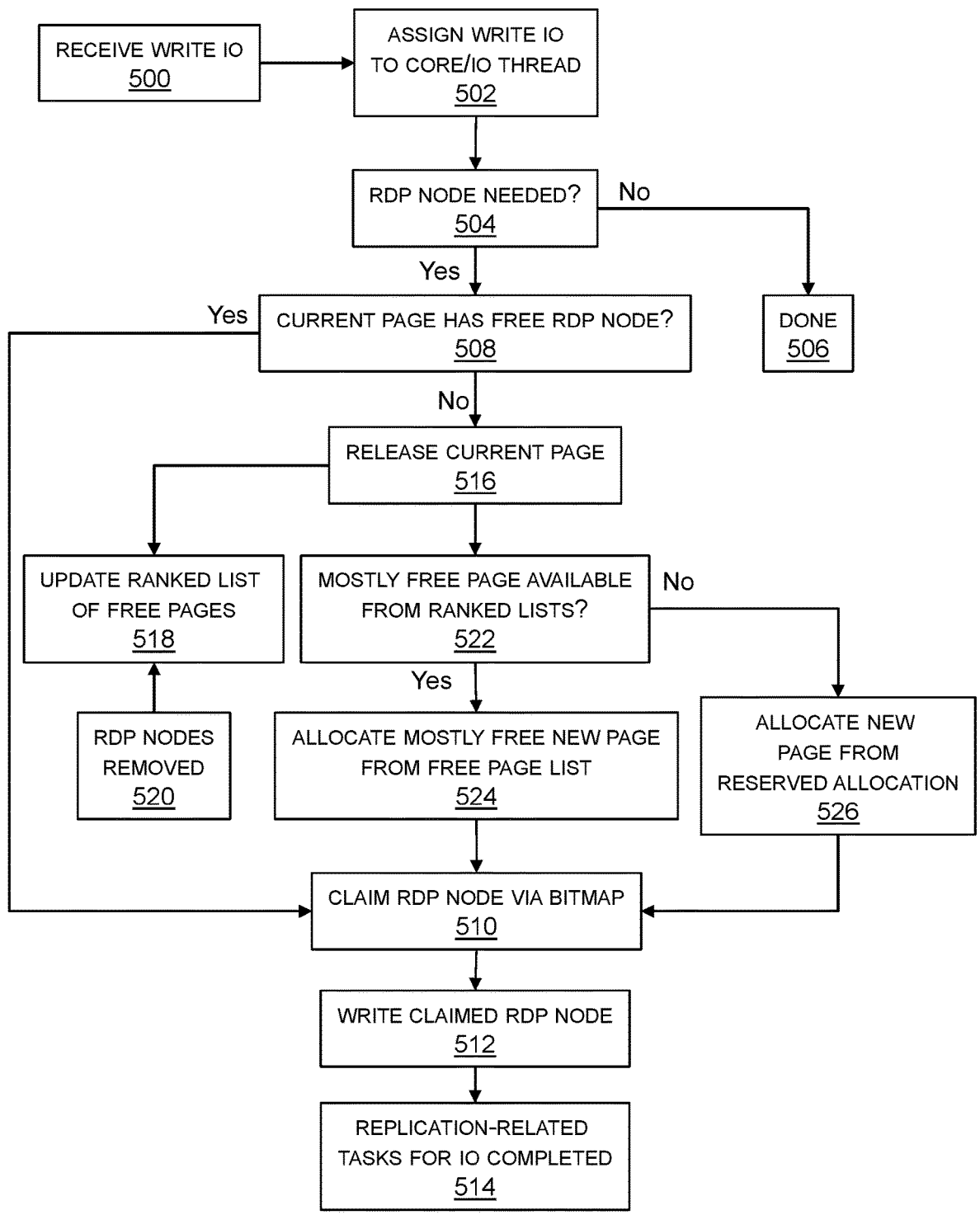
FIG. 5 illustrates a method for allocating and recycling pages of RDP metadata space from shared memory.

FIG. 5 illustrates a method for allocating and recycling RDP pages. A write IO is received in step 500. Step 502 is assigning the write IO to a processor core and associated IO thread. If an RDP node is not needed to service to the write IO as determined in step 504, then no further action associated with targetless snap creation is needed as indicated in step 506. This may occur, for example, when the write IO is directed to a storage object that is not protected by targetless snaps. If an RDP node is needed, then step 508 is determining whether the RDP page currently allocated to the IO thread has free RDP node space. If the currently allocated RDP page has free RDP node space, then that free RDP node space is claimed via the bitmap as indicated in step 510. The claimed free RDP node space is then written with RDPs as indicated in step 512. Replication-related tasks associated with targetless snap creation are then considered complete as indicated in step 514. If the currently allocated RDP page is full as determined in step 508, then that RDP page is released as indicated in step 516. The released RDP page is added to the ranked list as it becomes fragmented as indicated in step 518. The ranked lists are updated in response to removal of RDP nodes as indicated in step 520. Step 522 is determining whether an RDP page is available in the mostly free list of the ranked lists. If not, then a new empty RDP page is allocated from the reserved allocation of shared memory as indicated in step 526. An RDP node can then be claimed as indicated in step 510. If an RDP page is available from the mostly free list, then an RDP page is allocated to the IO thread from the mostly free list as indicated in step 524. An RDP node can then be claimed as indicated in step 510.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
   a plurality of non-volatile drives;
   at least one compute node comprising shared memory and at least one multi-core processor with a plurality of cores that have access to the shared memory;
   a plurality of input-output (IO) threads, each IO thread being uniquely associated with one of the cores; and
   at least one producer thread configured to allocate partially populated replication data pointer (RDP) pages to the IO threads responsive to release of currently allocated RDP pages, each IO thread being allocated no more than one RDP page at a time and having exclusive access to free RDP node space in the RDP page that is allocated to that IO thread such that other IO threads do not contend for the free RDP node space, each RDP page configured to accommodate a plurality of RDP nodes containing metadata associated with a targetless snapshot of a storage object.

2. The apparatus of claim 1 further comprising each of the IO threads configured to claim an RDP node from the RDP page allocated to that IO thread in response to assignment of an IO write to that IO thread.

3. The apparatus of claim 1 further comprising each of the IO threads configured to release the RDP page allocated to that IO thread in response to that RDP page lacking free RDP nodes.

4. The apparatus of claim 3 further comprising the producer thread configured to add released RDP pages to ranked lists of free pages, wherein each ranked list contains RDP pages ranked in terms of percent free RDP node space.

5. The apparatus of claim 4 further comprising the producer thread configured to allocate a mostly free RDP page from one of the ranked lists responsive to release of a full RDP page by one of the IO threads.

6. The apparatus of claim 5 further comprising the producer thread configured to update the ranked lists responsive to RDP node space being freed in the RDP pages.

7. The apparatus of claim 6 further comprising each of the IO threads being configured to use an RDP page usage bitmap to claim free RDP node space from an RDP page allocated to that IO thread.

8. A method comprising:
   in a storage system comprising at least one compute node with shared memory and at least one multi-core processor with a plurality of cores that have access to the shared memory:
   uniquely associating one of a plurality of input-output (IO) threads with one of the cores; and
   allocating partially populated replication data pointer (RDP) pages to the IO threads responsive to release of currently allocated RDP pages, each IO thread being allocated no more than one RDP page at a time and having exclusive access to free RDP node space in the RDP page that is allocated to that IO thread such that other IO threads do not contend for the free RDP node space, each RDP page configured to accommodate a plurality of RDP nodes containing metadata associated with a targetless snapshot of a storage object.

9. The method of claim 8 further comprising each IO thread claiming RDP nodes from the RDP page allocated to that IO thread in response to assignment of a IO write to that IO thread.

10. The method of claim 8 further comprising each IO thread releasing the RDP page allocated to that IO thread in response to that RDP page lacking free RDP nodes.

11. The method of claim 10 further comprising a producer thread adding released RDP pages to ranked lists of free pages, wherein each ranked list contains RDP pages ranked in terms of percent free RDP node space.

12. The method of claim 11 further comprising the producer thread allocating a mostly free RDP page from one of the ranked lists responsive to release of a full RDP page by one of the IO threads.

13. The method of claim 12 further comprising the producer thread updating the ranked lists responsive to RDP node space being freed in the RDP pages.

14. The method of claim 13 further comprising each of the IO threads using an RDP page usage bitmap to claim free RDP node space from an RDP page allocated to that IO thread.

15. A non-transitory computer-readable storage medium storing instructions that when executed by a computer cause the computer to perform a method comprising:
   in a storage system comprising at least one compute node with shared memory and at least one multi-core processor with a plurality of cores that have access to the shared memory:
   uniquely associating one of a plurality of input-output (IO) threads with one of the cores; and
   allocating partially populated replication data pointer (RDP) pages to the IO threads responsive to release of currently allocated RDP pages, each IO thread being allocated no more than one RDP page at a time and having exclusive access to free RDP node space in the RDP page that is allocated to that IO thread such that other IO threads do not contend for the free RDP node space, each RDP page configured to accommodate a plurality of RDP nodes containing metadata associated with a targetless snapshot of a storage object.

16. The non-transitory computer-readable storage medium of claim 15 in which the method further comprises each IO thread claiming RDP nodes from the RDP page allocated to that IO thread in response to assignment of a IO write to that IO thread.

17. The non-transitory computer-readable storage medium of claim 15 in which the method further comprises each IO thread releasing the RDP page allocated to that IO thread in response to that RDP page lacking free RDP nodes.

18. The non-transitory computer-readable storage medium of claim 17 in which the method further comprises a producer thread adding released RDP pages to ranked lists of free pages, wherein each ranked list contains RDP pages ranked in terms of percent free RDP node space.

19. The non-transitory computer-readable storage medium of claim 18 in which the method further comprises the producer thread allocating a mostly free RDP page from one of the ranked lists responsive to release of a full RDP page by one of the IO threads.

20. The non-transitory computer-readable storage medium of claim 19 in which the method further comprises each of the IO threads using an RDP page usage bitmap to claim free RDP node space from an RDP page allocated to that IO thread.

* * * * *